United States Patent [19]

Nishibori et al.

[11] 4,210,115
[45] Jul. 1, 1980

[54] WARM AIR INTAKE SYSTEM FOR AN INTERNAL COMBUSTION ENGINE

[75] Inventors: Kengi Nishibori, Nagoya; Fumio Hayashi, Toyata; Tadashi Ogawa, Kariya, all of Japan

[73] Assignee: Toyota Jidosha Kogyo Kabushiki Kaisha, Toyota, Japan

[21] Appl. No.: 917,243

[22] Filed: Jun. 20, 1978

[51] Int. Cl.² ............................................. F02M 31/00
[52] U.S. Cl. ................................ 123/122 D; 123/552; 236/101 C
[58] Field of Search ................ 123/122 D, 122 H; 236/101 C, 87, 86

[56] References Cited

U.S. PATENT DOCUMENTS

| 2,054,997 | 9/1936 | Vang | 123/122 H |
|---|---|---|---|
| 3,913,544 | 10/1975 | Fyie | 123/122 D |
| 3,918,421 | 11/1975 | Berry | 123/122 D |
| 4,068,800 | 1/1978 | Doherty | 236/87 |
| 4,126,109 | 11/1978 | Akado | 123/122 D |
| 4,126,110 | 11/1978 | Simmons | 123/122 D |

Primary Examiner—Ronald H. Lazarus
Attorney, Agent, or Firm—Finnegan, Henderson, Farabow, Garrett & Dunner

[57] ABSTRACT

A warm air intake system for an internal combustion engine having a change-over valve which selectively connects an air intake passage of the engine to a cold air source or to a warm air source, diaphragm means supplied with intake manifold vacuum by a vacuum passage so as to change-over the change-over valve in accordance with supply or relief of vacuum to its diaphragm chamber, and a snap action thermostat control valve which involves a temperature hysteresis between its on and off operations and which selectively opens a middle portion of the vacuum passage to the atmosphere in accordance with the temperature of the air flowing through the air intake passage.

2 Claims, 4 Drawing Figures

COLD AIR

WARM AIR

WARM AIR INTAKE SYSTEM FOR AN INTERNAL COMBUSTION ENGINE

BACKGROUND OF THE INVENTION

The present invention relates to a warm air intake system for an internal combustion engine.

In order to improve warming up performance of an internal combustion engine, and furthermore in order to improve operational performance of an internal combustion engine by improving atomization of fuel contained in the intake fuel-air mixture, particularly when the engine is operated in cold countries or in cold climate, it is known and actually practised to utilize warm air existing around the engine and heated by the heat generated in the engine as the intake air for the engine. A warm air intake system for this purpose generally comprises an intake passage and a change-over valve which selectively connects said intake passage to a cold air source such as the outside atmosphere or to a warm air source such as an air space defined around the engine, wherein the change-over valve is properly changed over so as to supply cold air taken from the cold air source to the intake passage or to supply warm air taken from the warm air source to the intake passage. The change-over valve in such a system is generally so adapted as to be operated by intake manifold vacuum of the engine conducted through a vacuum passage which incorporates therein a control valve which selectively opens a middle portion of the vacuum passage to the atmosphere so that the vacuum supplied to the diaphragm chamber is controlled by the on-off operation of the control valve and therefore the position of the change-over valve is determined by the on-off operation of the control valve. A control valve for this purpose generally employs a thermostat valve which opens or closes or valve port which is connected with a middle portion of the vacuum conducting passage in accordance with the temperature of the air supplied to the engine through the intake passage.

A conventional warm air intake system generally has a structure as shown in FIG. 1. In FIG. 1, 1 designates an intake manifold of an engine E which takes in air through a carburetor 2 and an air cleaner 3 attached to the inlet portion of the carbureter. The air cleaner 3 has an annular filtering element 4 which filters air flowing radially inwardly therethrough from its outside to its inside. At a peripheral portion of the housing of the air cleaner 3 is connected an air intake passage 5 which is selectively connected to a passage 7 or to a passage 8 by way of a change-over valve 6. The passage 7 is directly opened to the atmosphere so as to take in relatively cold atmospheric air, while on the other hand the passage 8 is adapted to open in the vicinity of the engine housing so as to take in warm air heated by the heat generated in the engine. The change-over valve 6 has a pivot shaft 9 and a damper 10 pivotably supported by the pivot shaft 9. The damper 10 is operated by a diaphragm means 12 by way of a link 11 which has one end pivotably connected with the damper 10 and the other end supported by a diaphragm 13 of the diaphragm means 12. The diaphragm 13 is resiliently driven downward in the figure by a compression coil spring 14 so that when vacuum of a predetermined level is supplied to a diaphragm chamber 15, the damper 10 is shifted upward as shown in the figure so as to connect the intake passage 5 to the warm air supply passage 8, while in contrast when vacuum supplied to the diaphragm chamber 15 is reduced or cancelled, the damper 10 is driven downward in the figure by the compression coil spring 14 so that the intake passage 5 is connected to the cold air supply passage 7. The diaphragm chamber 15 is connected to the intake manifold 1 by a vacuum passage 16–17 so that the diaphragm chamber is supplied with manifold vacuum. However, a passage 18 is branched from a middle portion of the passage 16–17 so that the middle portion is connected to a thermostat valve 19 provided in the central chamber space of the air cleaner 3 where the thermostat valve is exposed to the flow of air conducted through the intake passage 5 and the air cleaner 3. The thermostat valve 19 is adapted to selectively open the passage 18, that is, a middle portion of the passage 16–17 to the inner chamber space of the air cleaner, that is, substantially to the atmosphere. Therefore, in accordance with the on-off operation of the control valve 19 the vacuum level in the diaphragm chamber 15 is substantially changed. 20 designates a throttling means provided in the vacuum passage 17 upstream of said middle portion in order to make the on-off operation of the control valve 19 effectively reflect the change of vacuum in the diaphragm chamber 15.

In the conventional warm air intake system of this structure the thermostat control valve 19 is generally a bimetallic valve having the structure as shown in FIG. 2. In this structure a bimetal element 21 supports a valve element 22 by its free end which controls the opening of a valve port 23 which defines an open end of the passage 18. In this arrangement the bimetal element 21 is so adapted that when it becomes hotter due to increase of the temperature of the air the flow of which traverses the bimetal element, it flexes upward as seen in FIG. 2 so as tends to to open the port 23, while on the contrary when the temperature of the intake air lowers, the bimetal element straightens so as to tend to close the port 23. When the port 23 is opened, air is drawn through the port toward the passage 18 by the intake manifold vacuum applied to the passage 18, whereby the vacuum supplied to the diaphragm chamber 15 is attenuated so that the damper 10 is shifted downward in the figure. Then the intake passage 5 is supplied with an increased amount of cold air thereby lowering the temperature of the intake air. On the contrary, if the temperature of the air which traverses the bimetal element 21 is low, the bimetal element straightens so as to drive the valve element 22 downward in the figure to close the valve port 23. Then the diaphragm chamber 15 is effectively supplied with manifold vacuum so that the diaphragm 13 is shifted upward in the Figure thereby causing the damper 10 to turn upward in the Figure so that the intake passage 5 is supplied with warm air thereby increasing intake air temperature. This increase of intake air temperature is then responded to by the thermostat control valve 19 so that the system is then operated in the opposite direction, and thus the engine is operated with properly alternating supply of cold and warm intake air.

However, the conventional warm air intake system incorporating a thermostat control valve such as shown in FIG. 2 has the drawback that the bimetal element 21 and the valve element 22 are susceptible to vibration energized by the flow of air which traverses these movable elements and that, because of this, the operation of the system is unstable and the durability of the system is poor. Furthermore, a thermostat valve of this conventional structure requires a large amount of work for its mounting and adjustment. Furthermore, since a thermostat control valve of the structure as shown in FIG. 2 can provide an intermediate operating condition in which the port 23 is half open, the vacuum in the diaphragm chamber 15 can take a corresponding intermediate value which sets the damper 10 at its intermediate position in which the intake passage 5 is partly connected to the cold air supply passage 7 and is also party connected to the warm air supply passage 8. Such an intermediate condition might be thought to be desirable to provide intake air of a medium temperature. In fact, however, such an intermediate setting of the damper causes instability of the damper and provides unstable control of the warm air intake system.

SUMMARY OF THE INVENTION

As a result of various experimental research conducted by the inventors, it has been found that the damper for changing over the supply of cold air and warm air, i.e. the damper 10 in FIG. 1, should desirably be maintained in either of its two extreme change-over positions rather than being maintained at an intermediate position in order to ensure stable and improved performance of the engine, and that the control of the ratio between the supply of cold air and the supply of warm air should be made by varying the duty ratio in the changing-over operation of the change-over valve.

Based upon this understanding, the present invention proposes to incorporate, in a warm air intake system for an internal combustion engine having the basic structure as mentioned above which comprises an air intake passage, a change-over valve which selectively connects said intake passage to a cold air source or to a warm air source, a diaphragm means which operates said change-ovder valve, a vacuum passage which conducts intake manifold vacuum of the engine to said diaphragm means, and a thermostat valve which selectively opens a middle portion of said intake passage to the atmosphere in accordance with the temperature of the air flowing through said intake passage, a snap action thermostat valve which serves as said thermostat valve and which has a valve element which snappingly changes its shape in accordance with changes of its temperature with a temperature hysteresis involved therein so that when said valve element is heated up to a first predetermined temperature, said change-over valve is changed over so as to connect said intake passage to said cold air source and when said valve element is cooled down to a second predetermined temperature, said change-over valve is changed over so as to connect said intake passage to said warm air source.

BRIEF DESCRIPTION OF THE DRAWING

The present invention will become more fully understood from the following detailed description and the accompanying drawings which are given by way of illustration only, and are not intended to limit the scope of the present invention and wherein.

DESCRIPTION OF THE PREFERRED EMBODIMENT

Figure 1:
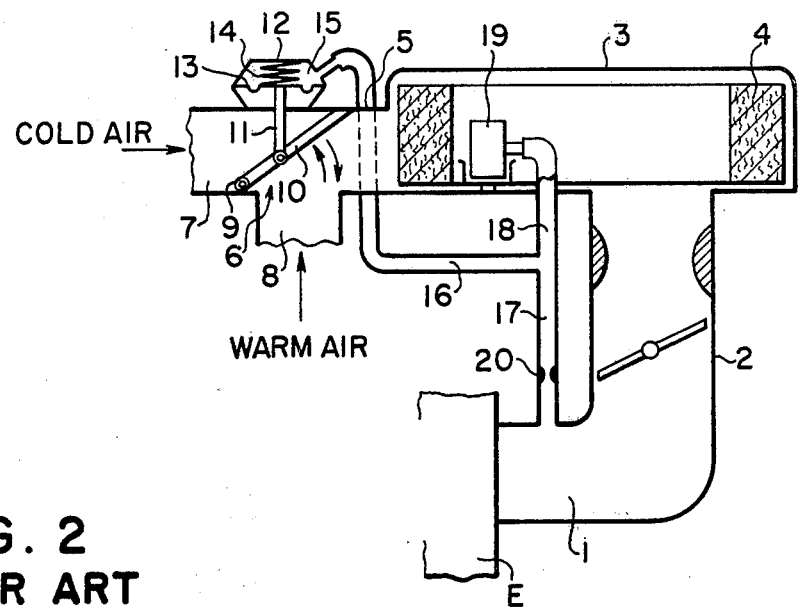
FIG. 1 is a diagrammatical sectional view showing the general structure of a conventional warm air intake system for an internal combustion engine in which the present invention is to be incorporated.
Figure 2:
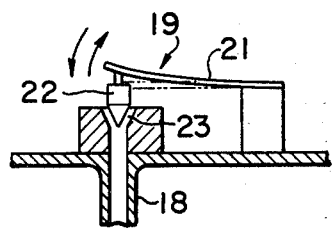
FIG. 2 is a sectional view showing a conventional thermostat control valve incorporated in the warm air intake system shown in FIG. 1.
Figure 3:
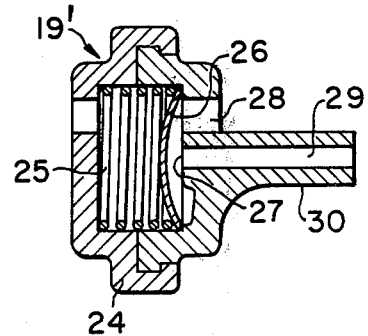
FIG. 3 is a sectional view showing a snap action thermostat control valve which is to be incorporated in the warm air intake system shown in FIG. 1 in accordance with the present invention.

FIG. 3 shows an example of a snap action thermostat control valve which is desirable for use with the warm air intake system shown in FIG. 1 in order to embody the concept of the present invention. The snap action thermostat valve shown in FIG. 3 is of the type which itself is well known in the art and is used for various thermal control purposes. The valve 19' shown in FIG. 3 has a housing 24 in which are mounted a compression coil spring 25 and a thermosensitive disk element 26 having the shape of a part of a sphere. The disk element 26 controls opening of two valve ports 27 and 28 so as to allow these two ports to communicate with each other or to prevent communication between these two ports. In more detail, when the disk element 26 is in a cold state, it is flattened so as to closely contact the bottom surface of the housing where the port 27 and 28 open thereby isolating these two ports from each other. Starting from this condition, when the disk element is heated up to a first predetermined temperature, the disk element instantaneously changes its shape from the flattened shape to the shape of a part of a sphere as shown in FIG. 3 so that the ports 27 and 28 communicate with each other. On the other hand, when the disk element 26 which is in a warm state and has the shape of a part of a sphere as shown in FIG. 3 is cooled down to a second predetermined temperature which is somewhat lower than said first predetermined temperature, the disk element instantaneously changes its shape from the part-of-a-sphere shape as shown in FIG. 3 to the flattened shape so as to interrupt communication between the ports 27 and 28. When this thermostat control valve is incorporated in the system shown in FIG. 1, it is of course so mounted that the passage 29 defined by a stem portion 30 and connected to the port 27 is connected with the passage 18. The desired thermosensitive performance of a thermostat control valve of this type can be easily obtained by the process of proper quality control with regard to the disk element 26. Furthermore, the thermostat valve shown in FIG. 3 is very conveniently mounted in the system shown in FIG. 1. Of course, the disk element 26 does not vibrate by the effect of air flow which passes through the thermostat control valve 19'. Therefore, the thermostat valve shown in FIG. 3 operates at high accuracy only in response to the temperature of the air which traverses the thermostat valve.

Figure 4:
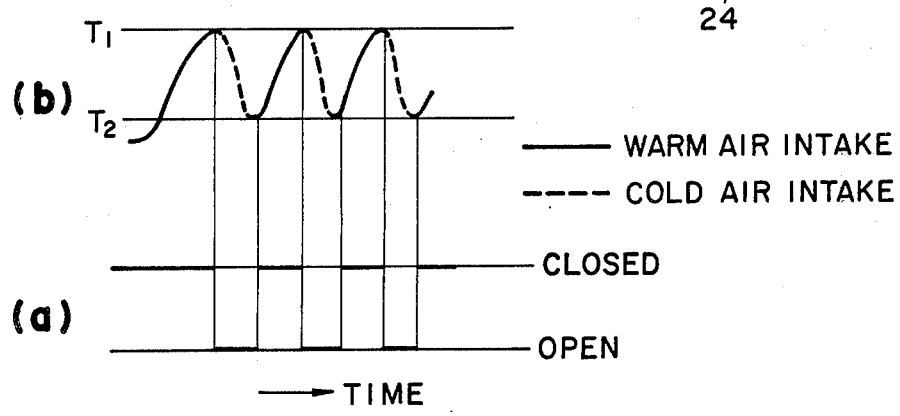
FIG. 4 shows graphs which illustrate operational performance of the warm air intake system of the present invention.

FIG. 4 shows graphs which illustrate the operational performance of a warm air intake system having the basic structure as shown in FIG. 1 in which a thermostat control valve as shown in FIG. 3 is incorporated as the thermostat control valve 19. Graph (a) in FIG. 4 shows on and off conditions of the thermostat valve 19'. As shown in the graph, the valve takes either the fully opened condition or the fully closed condition which are alternately repeated after a lapse of time. In accordance with this on and off operation of the thermostat control valve 19', the damper 10 is changed over between the two extreme shift positions so that the intake passage 5 is connected completely to the cold air supply passage 7 or completely to the warm air supply passage 8. However, since the intake passage system including passage means, air cleaner, etc. has a certain amount of heat capacity, in spite of such a complete changing-over between the cold air supply and the warm air supply, the temperature of the intake air supplied to the engine gradually changes as shown in FIG. 4(b). In this case, by properly determining the thermosensitive performance of the disk element 26 in relation to the temperature of the warm air source and the cold air source and to the heat capacity of the intake passage system, the upper and lower temperature limits T1 and T2 are determined to be at the desirable levels, and such an operational condition is stable and is accomplished without being affected by other disturbances such as vibration of the bimetal element 21 or of damper 10 in the conventional system.

From the foregoing it will appreciated that the present invention provides an improved warm air intake system for an internal combustion engine by a simple modification of the conventional system such as to replace the conventional bimetallic thermostat control valve by a snap action thermostat control valve having a thermosensitive snap disk element which is simple in structure and less expensive in costs.

Although the invention has been shown and described with respect to a preferred embodiment thereof, it should be understood by those skilled in the art that various changes and omissions of the form and detail thereof may be made therein without departing from the scope of the invention.

We claim:

1. A warm air intake system for an internal combustion engine, comprising:
    (a) an air intake passage;
    (b) a change-over valve having a damper element being movable between a first shift position for connecting the air intake passage substantially exclusively to a cold air source and a second shift position for connecting the air intake passage substantially exclusively to a warm air source;
    (c) a diaphragm means having a diaphragm chamber for shifting said damper element between said first and second shift positions, the position of said damper element depending on whether intake vacuum of the engine or atmospheric pressure is supplied to said diaphragm chamber;
    (d) a vacuum passage conducting intake vacuum of said engine to said diaphragm chamber; and
    (e) a thermostat valve responsive to the temperature of the air flowing through said air intake passage, having a port passage which connects said vacuum passage to the atmosphere, and a temperature-sensitive valve element which shifts between one position fully opening said port passage and another position fully closing said port passage, said valve element comprising a disc element the shape of which depends on said air temperature in such a manner that when said air temperature increases the temperature of said disc element above a first predetermined value, the disc has a curved shape and when said air temperature decreases the temperature of the disc element below a second predetermined value, which is substantially lower than the first predetermined value, the disc has a flattened shape.

2. The system of claim 1, wherein said port passage has a flat valve face onto which said disk element is closely seated when it is flattened in a cold state and from which the central portion of said disk element is raised when it takes the curved shape in a warm state.

* * * * *